US007859722B1

(12) United States Patent
Kulkarni

(10) Patent No.: US 7,859,722 B1
(45) Date of Patent: Dec. 28, 2010

(54) PRESERVING PURE GRAY COLORS IN A WORKFLOW

(75) Inventor: Manish S. Kulkarni, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 535 days.

(21) Appl. No.: 12/014,678

(22) Filed: Jan. 15, 2008

(51) Int. Cl.
*H04N 1/60* (2006.01)

(52) U.S. Cl. ........................ 358/1.9; 358/518; 358/521; 358/523

(58) Field of Classification Search .................. 358/1.9, 358/3.21, 3.23, 504, 518–523; 382/167
See application file for complete search history.

(56) References Cited

U.S. PATENT DOCUMENTS 6,137,594 A 10/2000 Decker et al.
6,320,668 B1 * 11/2001 Kim ........................... 358/518
6,919,972 B2 7/2005 Kumada et al.
6,930,690 B1 8/2005 Kulkarni
7,046,393 B2 5/2006 Zeng
7,199,900 B2 4/2007 Ogatsu et al.
7,312,893 B2 * 12/2007 Bestmann et al. ............ 358/1.9
7,633,646 B2 * 12/2009 Ichitani ...................... 358/1.9
7,679,783 B2 * 3/2010 Pellar ......................... 358/1.9
2004/0196475 A1 10/2004 Zeng et al.
2006/0158669 A1 7/2006 Haikin et al.
2006/0170993 A1 8/2006 Jacob

OTHER PUBLICATIONS

CHROMiX "CHROMiX Launches ColorThink Pro" http://www2.chromix.com/about/pressrelease.cxsa?snid=1197&-session=SessID:26722A650f366116B2yqn40F3F92, Sep. 7, 2005.

* cited by examiner

*Primary Examiner*—Scott A Rogers
(74) *Attorney, Agent, or Firm*—Fish & Richardson P.C.

(57) ABSTRACT

Systems and methods, including computer software products, for processing gray colors in a conversion between color spaces involve identifying a lookup table used to convert a color value from a first color space to a second color space. The method includes identifying a pure gray color value from a first plurality of color values, determining a corresponding pure gray color value in the second color space substantially equivalent to the pure gray color value from the first plurality, and replacing a corresponding non-pure gray color value with the corresponding pure gray color value. The method includes identifying near gray color values in the second plurality of color values that are located in relatively close proximity in the lookup table to the corresponding pure gray color value in the second color space. The method also includes modifying the lookup table by replacing the near gray color values using a smoothing function.

22 Claims, 6 Drawing Sheets

```
const Int kModifyRadius = kGridSize / 8;
const Real kSigmoidSwing = 12.0;
const Real kSigmoidOffset = 0.4;
dstPtr = data;

for (j = 0; j < kGridSize; j++)
for (k = 0; k < kGridSize; k++)
for (l = 0; l < kGridSize; l++)
for (m = 0; m < kGridSize; m++)
{
if (!j && !k && !l) // Input CMY = 0.
{
      // Set Output CMY = 0.
      *dstPtr++ = 0;
      *dstPtr++ = 0;
      *dstPtr++ = 0;
      // Set Output K.
      *dstPtr++ = ramp [kGridSize - 1 - m];
}
else if (j <= kModifyRadius && k <= kModifyRadius && l <=
kModifyRadius)
{
      Real orgVal, newVal;
      Real dist = Max(Max(j, k), l) / (Real) kModifyRadius;
      dist = 1.0 / (1.0 + exp (-kSigmoidSwing * (dist -
kSigmoidOffset)));;
      // Blend CMY between 0 and colorimetric orgVal.
      orgVal = *dstPtr ;
      *dstPtr++ =  dist * orgVal;
      orgVal = *dstPtr ;
      *dstPtr++ = dist * orgVal;
      orgVal = *dstPtr ;
      *dstPtr++ =  dist * orgVal;
      // Blend K between ramp and colorimetric orgVal.
      orgVal = *dstPtr ;
      newVal = ramp [kGridSize - 1 - m];
      *dstPtr++ =  dist * orgVal + (1.0 - dist) * newVal;
}
else
{

      dstPtr++;
      dstPtr++;
      dstPtr++;
      dstPtr++;
}
}
```

FIG. 5

PRESERVING PURE GRAY COLORS IN A WORKFLOW

BACKGROUND

The present disclosure relates to the field of data processing, and more specifically to preserving pure gray colors during color conversion.

Digital devices that create (e.g., scanners and digital cameras), display (e.g. CRT and LCD monitors), or print (e.g. ink-jet and laser printers) colors typically define color data using color spaces. Generally, a color space is a combination of a color model and a gamut. A color model defines each color within the model using primary color components, such as, in the case of a Red, Green, Blue (RGB) color model, the levels of red, green, and blue light components needed to create each color, or in the case of a Cyan, Magenta, Yellow, and Key (CMYK) color model, the levels of cyan, magenta, yellow, and black ink needed to create each color. Levels of each component the color models typically range from 0 to 100 percent of full intensity. By varying the levels or intensities of the components, each color in the color model may be created. However, as a practical matter a device is often limited in its ability to create pure red, green, or blue light, which limits its range of colors or color gamut. A gamut is simply the range of colors that may be displayed on, rendered by, or captured by a particular device.

The differences in device gamuts and primary color definitions lead to differences in color spaces between devices. For example, two devices that use RGB may show different colors when each displays its most intense red. The most intense red on a first device may have an intensity of 1 for the R component and 0 for the G and B components. However, the color that looks the same as the most intense red of the first device may have a red intensity of 0.85 on a second device. Moreover, the G and B component intensities may even be 0.05 on the second device. In other words, the same perceived "red" color has different RGB component values depending on the device, on the first device it may be (1, 0, 0) and on the second device that same "red" may be (0.85, 0.05, 0.05). This means that an image file containing only RGB values, if displayed directly by both devices, would appear differently on the two devices.

To solve this problem of the same component values appearing differently on different devices, color spaces can be defined in relation to device-independent color spaces, which define colors in more absolute terms. Some examples of device-independent color spaces include the CIE XYZ and CIE L*a*b* color spaces. The relationship of a device's native color space with a device-independent color space typically is described by some combination of formulas, transfer functions, matrices, and look up tables. This relationship may be stored in an International Color Consortium (ICC) or other color profile for the device. The device-independent color space may be used as an intermediate when converting from one device-dependent color space to another.

The conversion from one color space to another may be done through a series of conventional processing steps. Some processing steps may be more computationally intensive than others. Some processing steps may require interpolation. Generally, there is a tradeoff between the number of steps, the complexity of each step, speed, and accuracy. In some applications, speed is of the essence and accuracy is sacrificed by reducing the number of steps and/or the complexity of the individual steps. Often to increase speed, a look up table (LUT) is used either alone or with another simple processing step. A LUT maps points in one color space to corresponding points in another color space. For example, a color in a first RGB color space may have the color component values of (0, 45, 82) which, when converted to a second RGB color space, the color may have the color component values (5, 51, 76). This is because the color profile for each color space defines pure R, G, and B components differently. A LUT may be constructed by transforming a regularly spaced grid of colors in a first color space to a second color space using the most accurate processing steps, such as using the color profiles for example. Each grid point and its corresponding transform point in the second color space may be stored in the LUT. Converting colors that do not correspond to the grid points would involve interpolation, therefore, the more grid points the more accurate the conversion. However, increasing the number of the grid points complicates the LUT and may result in an increase in processing time.

Gray colors are often specified using the K channel of a CMYK color space. When colors are converted from one CMYK color space to another CMYK color space, such as in the case of going from editing to printing, colors having only a K component value (e.g., (0,0,0,50)) may be converted to a four channel CMYK color (e.g., (21,22,33,34)), which may result in an undesirable image or wasted ink.

SUMMARY

This specification describes technologies relating to preserving pure gray colors in a workflow.

Systems and methods, including computer software products, for processing gray colors in a conversion between color spaces involve identifying a lookup table used to convert a color value including a plurality of color component values from a first color space to a second color space. The lookup table includes a first plurality of color values associated with the first color space and a second plurality of color values associated with the second color space. Each of the first plurality of color values has a corresponding color value in the second plurality of color values. The method further includes identifying a pure gray color value from the first plurality of color values. The pure gray color value has a corresponding non-pure gray color value in the second plurality of color values. The method further includes determining a corresponding pure gray color value in the second color space that is substantially equivalent to the pure gray color value from the first plurality of color values. The method also includes modifying the lookup table by replacing the corresponding non-pure gray color value in the second plurality of color values with the corresponding pure gray color value in the second color space. The method further includes identifying one or more near gray color values from the second plurality of color values. The one or more near gray color values are located in relatively close proximity in the lookup table to the corresponding pure gray color value in the second color space. The method also includes modifying the lookup table by replacing the one or more near gray color values using a smoothing function.

These and other embodiments can optionally include one or more of the following features. The one or more near gray color values can be identified as being located in relatively close proximity in the lookup table to the corresponding pure gray color value in the second color space based on the one or more near gray color values having color component values that are close in value to the corresponding non-pure gray color value in the second plurality of color values. The smoothing function can include a function having a zero slope at its extremes. The smoothing function can be a sigmoid function, each of the one or more near gray color values in the second plurality of color values can include non-gray component values and a gray component value, and modifying the lookup table by replacing the one or more near gray color values using a smoothing function can include, for each of the one or more near gray color values: calculating a first distance based on the proximity in the lookup table of the near gray color value to the corresponding pure gray color value in the second color space; determining a second distance by applying a sigmoid function to the first distance; determining new non-gray component values for the near gray color value by multiplying each of the non-gray component values of the near gray color value by the second distance; and determining a new gray component value by interpolating between a gray component of the corresponding pure gray color value and the gray component of the near gray color value.

Determining a corresponding pure gray color value in the second color space that is substantially equivalent to the pure gray color value from the first plurality of color values is based on a perceptual relationship between a rendering of the corresponding pure gray color value in the second color space and a rendering of the pure gray color value from the first plurality of color values. The first color space can include a Red, Green, Blue (RGB) color space; the pure gray color value comprises Red, Green, and Blue component values that are equal to one another; and the corresponding non-pure gray color value can include Red, Green, and Blue component values that are not equal to one another. The first color space can include a Cyan, Magenta, Yellow, Key (CMYK) color space; the pure gray color values can include Cyan, Magenta, and Yellow component values that are equal to zero; and the corresponding non-pure gray color value can include at least one of a Cyan, Magenta, or Yellow component value that is not equal to zero. The plurality of color values from the first color space can include at least 16 component values for each of the CMYK color components.

The lookup table can be initially populated using a first color profile associated with the first color space and a second color profile associated with the second color space. The first plurality of color values associated with the first color space can include equally spaced grid points whose values range from a lowest intensity to a highest intensity for each component in the first color space. Each of the one or more near gray color values can include grid points that are within three grid points of the corresponding pure gray color value in the second color space. Determining a corresponding pure gray color value in the second color space can include: determining a maximum pure gray color value in the second color space by converting the darkest color of an independent color space to the second color space using a color profile associated with the second color space; mapping each of a plurality of pure gray color values from the first color space to a first corresponding luminance value in the independent color space using a color profile of the first color space; mapping each of a plurality of pure gray color values from the second color space to a second corresponding luminance value in the independent color space using a color profile of the second color space; and for each of the plurality of pure gray color values from the first color space, determining a corresponding pure gray color value from the second color space, using the maximum pure gray color value in the second color space and the first and the second corresponding luminance values in the independent color space.

These and other embodiments can further include receiving a file having input color data in the first color space; converting the input color data to the second color space using the modified lookup table; and storing the converted input data.

Particular embodiments of the subject matter described in this specification can be implemented to realize one or more of the following advantages. The print quality for pure gray colors may be increased. The print quality for other colors may be unchanged or decreased negligibly. The modified conversion transform may be created quickly, which enables certain embodiments to be used in a variety of situations.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 5 is a code excerpt of an example computer program implementing portions of the described subject matter.

Like reference numbers and designations in the various drawings indicate like elements.

DETAILED DESCRIPTION

Work flows often require the conversion of files from one color space to another, even if the color spaces are based on the same color model, such as the Cyan, Magenta, Yellow, and Key (CMYK) color model. For example, a desktop publishing file may be created and edited using a desktop publishing software program that consistently used a source CMYK color space defined by a first color profile. That file may then be sent to a printing press that uses a destination CMYK color space defined by a second color profile. In order to print the desktop publishing file in a way that preserves the intended color, the printing press would convert the file from the source colors pace to the destination color space using the color profiles, or a look up table (LUT) created from the profiles. In doing so, however, source pixels with color values that are "pure gray" may be converted to a destination color value that is non pure gray. "Pure gray" color values may differ depending on the color space. For example, "pure gray" color values in a CMYK color space are defined as color values whose non-gray component values (C, M , and Y components) are zero and whose gray component value (K component) is usually non-zero. In a Red, Green, Blue (RGB) color space, "pure gray" color values are defined as color values whose component values (R, G, and B) are all equal. Because of the way many printers render colors, gray colors that have pure gray values (using only K ink) will appear crisp when rendered, while gray colors that have non-zero C, M, and Y component values may appear fuzzy or muddled. Also, less ink may be used to render a gray color using pure gray values than with using the other (usually more expensive) color inks to render the gray color. Thus, it is often desirable to preserve the pure gray nature of gray colors when converting from a source color space to a destination color space.

Figure 1:
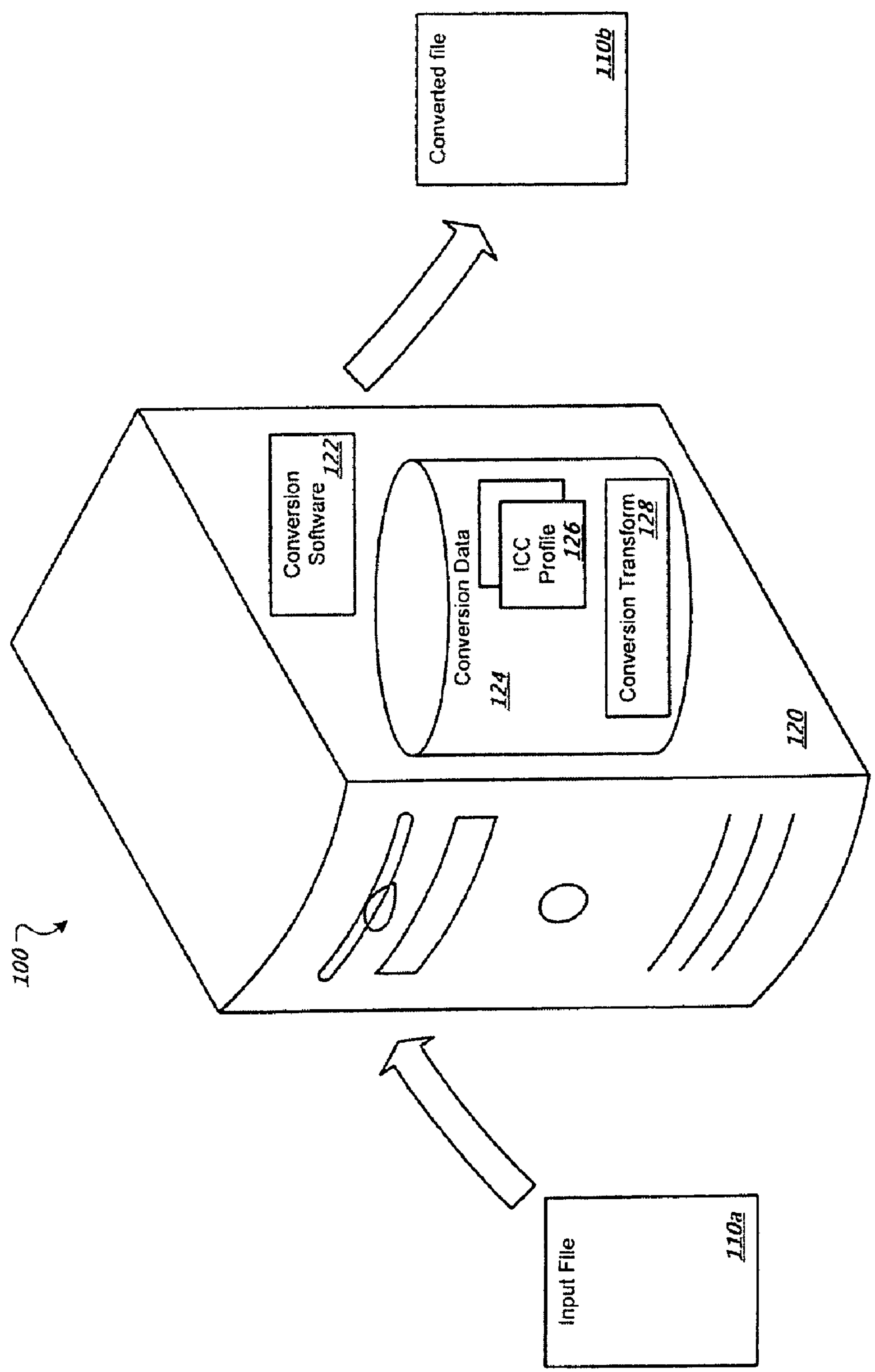
FIG. 1 is a block diagram of an example color conversion system.

As shown in FIG. 1, a color conversion system 100 includes a processing machine 120 that receives an input file 110 having colors expressed in a source color space and transmits a converted file 130 having colors expressed in a destination color space. The processing machine 120 includes conversion software 122 and conversion data 124 that stores color profiles 126 and a conversion transform 128 that preserves the pure gray nature of the color values. Generally, the color conversion system 100 creates the conversion transform 128 using the conversion software 122 and the color profiles 126. The conversion transform 128 may be a modified version of a conventional LUT, where the conventional LuT's destination gray color values are replaced with pure gray color values and destination color values near the gray colors (near gray colors) are modified to smooth the transition from the replaced values to the original values. In some embodiments, the smoothing may reduce the interpolation errors, and thus reduce artifacts such as banding, when converting and rendering near gray colors. Other advantages of some embodiments include rendering gray colors with less ink and increasing the quality (e.g., crispness) of rendered gray colors.

The input file 110*a* and converted file 110*b* (collectively, files 110) each may be any collection of electronic data that includes color data defined in a particular color space. The input file 110*a* generally includes color data in a source color space and the converted file 130 generally includes color data in a destination color space. The files 110 may also include other data, such as text, embedded fonts, images and 2D vector graphics data (data in addition to related color data), digital rights management information, and other types of non-color data. The files 110 may adhere to a given specification or format, including, for example, Extensible Markup Language Paper Specification (XPS), portable document format (PDF), Joint Photographic Experts Group (JPEG), Tagged Image File Format (TIFF), and Portable Network Graphics (PNG) file formats. The source color space may be based on any of a variety of color models, such as RGB, CMYK, YCrCb, and many others. The destination color space may be based on any of a variety of color models and color spaces that include a gray component, such as, for example, CMYK and CcMmYK. The input file 110 may also include a color profile that defines the color space used within the file.

The processing machine 120 can be any apparatus, device, or collection of machines for processing data, including, for example, a programmable processor, a computer, or multiple processors or computers. The processing machine 120 can include, in addition to hardware, code that creates an execution environment for the computer program in question, e.g., code that constitutes processor firmware, a protocol stack, a database management system, an operating system, or a combination of one or more of them. The processing machine includes color conversion software 122 and conversion data 124.

Generally, the color conversion software 122 may be a computer program that is executed by the processor 110 to facilitate color conversion. A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one processing machine 120 or on multiple processing machines 120 that are located at one site or distributed across multiple sites and interconnected by a communication network.

The conversion data 124 facilitates the transformation of color data from the source color space of the input file 110 to destination color space of the converted file 130. The conversion data 124 may be described in a table, a matrix, a formula, a flat file, a computer program, or any combination of these. The conversion data 124 may describe or embody any type of processing that is usually associated with color conversion. The processing may be a single step or a series of steps that may utilize any combination of formulas, matrices, or look up tables. The conversion data 124 may include one or more color profiles 126 and conversion transforms 128. Generally, a color profile 126, associated with a particular color space, is a file that contains information on converting color values in the particular color space to color values in another, usually device-independent, color space. One example type of a color profile 126 is an International Color Consortium (ICC) profile.

A conversion transform 128 is a data structure that facilitates the conversion from the source color space to the destination color space. The conversion transform 128 may be implemented as a LUT. A LUT is essentially a multi-dimensional table that maps discrete input points, as given by their multi-dimensional coordinates, to discrete output points. The number of coordinates in the input need not match the number of coordinates of the output. For example, a source color space based on a three-dimensional color model, such as RGB, may be mapped to a destination color space based on a four-dimensional color model, such as CMYK. For instance, an input point having RGB coordinates or component values (0.19, 0.19, 0.19) may be mapped to an output point having CMYK coordinates or components values (0, 0, 0, 0.27). A LUT for converting between color spaces may be created using data obtained from experimentation or obtained mathematically using known processing steps, such as those that may be defined in color profiles 126.

In operation, the processing machine 120 executes the color conversion software 122. In so doing, system 100 may create a conversion transform 128 using the color profiles 126. For example, a conversion transform 128 for converting from a source CMYK color space to a destination CMYK color space may be constructed by first creating a conversion ramp to convert the source K component value to a corresponding destination K component value by accounting for the source and destination black ink characteristics such as dot gain and the maximum black (K) ink of the destination color space. A conversion ramp maps varying source values of K going from 0 to 100% in a predetermined number of steps to destination values. The maximum K of the destination color space may be determined by converting the darkest possible color, such as CIE L*a*b* color value of (0,0,0), to the destination color space and using the resulting K as the maximum K ink.

The ramp is created by combining a source ramp with an inverted destination ramp. The source ramp is constructed using the source color profile to convert a ramp of source K-only color values to a device-independent color space and using the value of the luminance component of the device-independent color space in the ramp. For example, when converting from the source color space to the CIE XYZ color space, the source K-only values and corresponding Y component values (Y represents luminance in the CIE XYZ color space) may be used. The luminance component of other device-independent color spaces may also be used, such as the L component of the CIE-Lab color space and the L component of CIE-Luv color space. A similar destination ramp, containing destination color values mapped to the luminance component of a device-independent color space, may be constructed using K-only values in the destination color space and the color profile of the destination space. This ramp may be inverted to obtain an inverse destination ramp from the Y component value to the destination K-only value and capped at the previously computed maximum K ink of the destination color space. The source ramp and the capped inverse destination ramp may be combined by matching, and possibly interpolating, the Y values of the source ramp and destination ramp to build a ramp from source K to destination K.

The conversion transform 128 can be implemented as a multi-dimensional LUT. A four-dimensional LUT may be used to map a source CMYK color space to a destination CMYK color space. A conventional LUT may be constructed by transforming a regularly spaced grid of colors in the source color space to the destination color space using conventional processing steps, such as using the color profiles 126, for example. Each source color space grid point and its corresponding transform point in the destination color space may be stored in the LUT. Converting colors that do not correspond to the grid points would involve interpolation. Therefore, the more grid points the more accurate the conversion, but increasing the number of the grid points complicates the LUT and may result in an increase in processing time. A LUT may contain any number of grid points, for example a 16×16×16×16 LUT may be used to implement the conversion transform 128. Due to the nature of the conventional conversion process, a CMYK to CMYK conventional LUT may contain mappings from a K-only source color to a non-K-only destination color. For example, a source CMYK value (0,0,0,100) may be mapped to (85, 79, 79, 87). In such an instance, the K-only nature of the color is not preserved.

The conventional LUT may be modified to preserve the pure gray nature of the gray colors and to smooth the conversions of colors near the gray colors. The pure gray color preservation modification may be made by replacing, with a K-only color value, each destination value in the LUT that corresponds to a source grid point having a K-only value. The destination K-only values may be determined by converting the source K-only values using the conversion ramp described above. After replacing the destination color values with pure gray values, there may be large differences in color component values between the gray colors and the near gray colors, i.e., those non-gray colors that are closest to the gray colors. For example, a gray destination color that was originally (80, 70, 65, 80) may be replaced with a pure gray value of (0, 0, 0, 100). This new pure gray value, however, may be next to a near gray color having a value of (71, 61, 59, 73), which would be a large difference in the C, M, and Y component values. Interpolation (e.g., between the pure gray value and the adjacent near gray value) in this instance may result in less accurate color transformation than if the points were closer in value. The modification to smooth transitions for near gray colors may be made by replacing the destination values corresponding to near gray source colors with destination values as determined using a blending function. Near gray colors may be defined as colors whose values are a certain distance from the gray color values, such as within one to three grid points from pure gray color values (the K-only axis).

The blending function may be based on the distance the grid point is from the K-only axis. The distance may be determined by computing the maximum of the distance in each of the C, M, and Y component directions. Other techniques for determining distance can also be used, such as calculating the true distance by combining the distances in the C, M, and Y component directions. The blending function may be any of several functions having a zero slope at each end, such as a cosine function and a sigmoid function. One such blending function is a shifted sigmoid function, having the form:

$$f(x)=1/(1+\exp(-\text{swing}*(x-\text{offset}))),$$

where swing determines the steepness of the curve as the function progresses from zero to 1, x is the distance from the K-only axis, and the offset shifts the curve. A variety of swing and offset values may yield acceptable results. One such combination is a swing value of 12 and an offset of 0.4. For each source near gray color grid point, the blended destination non-K component color values may be determined by multiplying the original destination non-K component value by the result of the sigmoid function applied to the near gray color's distance. The blended K component value may be determined by using the near gray color's distance (e.g., true distance, maximum of the distance in each of the C, M, and K component directions, or suing a sigmoid function applied to a distance measure) to interpolate between the original destination K component value (i.e., of the near gray color) and the K component value (i.e., of the nearest pure gray color) as determined by the conversion ramp.

After the LUT has been modified, system 100 may receive color data in the input color file 110 and create the converted file 130 from the input file 110 using the LUT.

Figure 2:
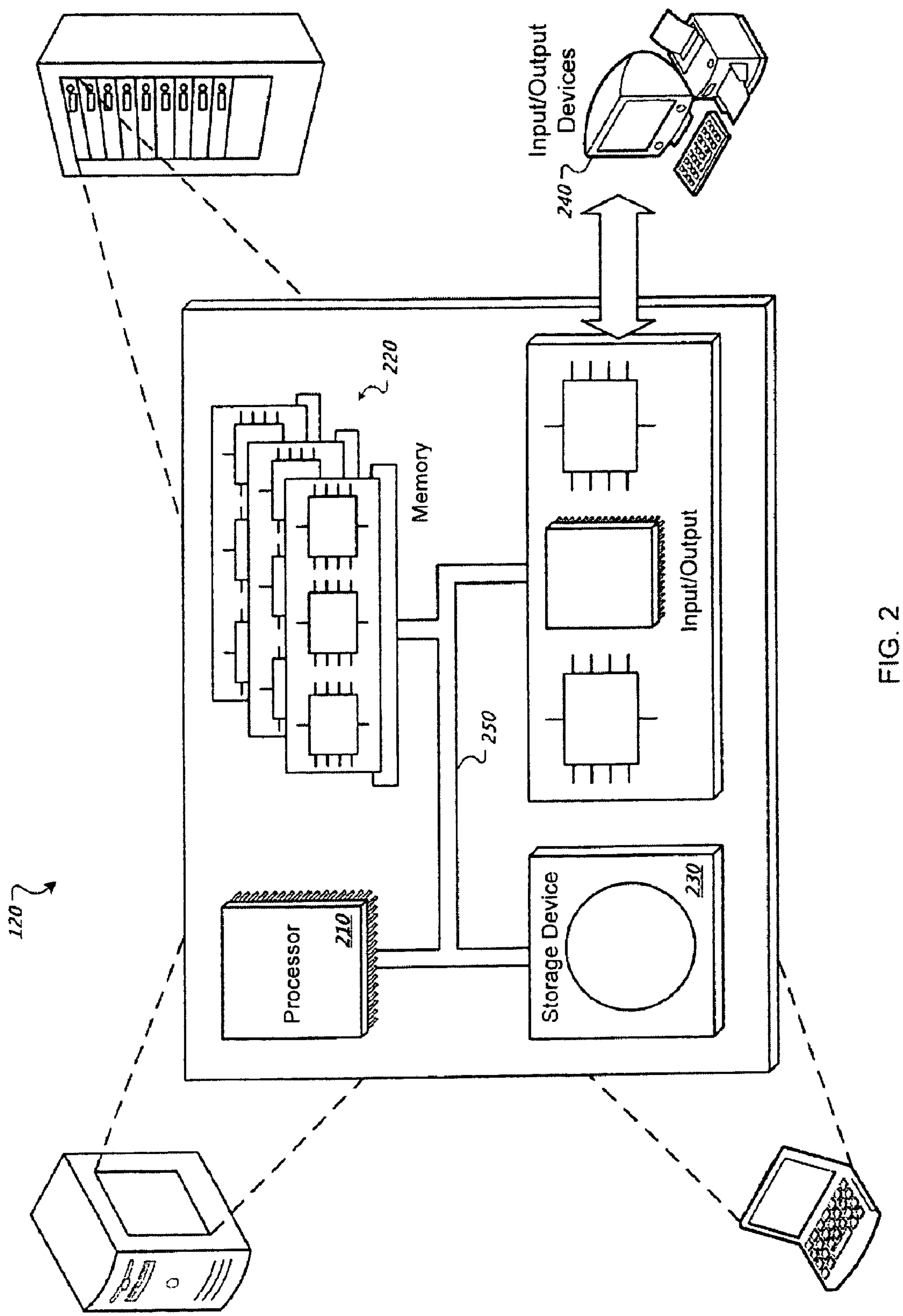
FIG. 2 illustrates an example of a processing machine that can be used with the system of FIG. 1.

FIG. 2 illustrates an example processing machine 120. In general, the processing machine 120 includes a processor 210, memory 220, storage device 230, input/output devices 240, and communications bus 250, which allows the other devices to communicate with one another. Input and output devices 240 include any device that may interact with a processing machine 120, such as printers, monitors, keyboards, trackballs, mice, networks, etc.

A processor 210 may be suitable for the execution of a computer program, and includes, by way of example, both general and special purpose microprocessors, and any one or more processors of any kind of digital computer. Moreover, the processor 210 may be embedded in another device, e.g., a mobile telephone, a personal digital assistant (PDA), a mobile audio player, a Global Positioning System (GPS) receiver, a notebook computer, a desktop computer, or a server, to name just a few possible examples. Generally, a processor will be operatively coupled to receive data and/or instructions from, or transfer data to, a memory 220.

The memory 220 and storage device 230 are computer readable media suitable for storing computer program instructions and data. The memory 220 may be any form of volatile or non-volatile memory, media and memory devices, including by way of example semiconductor memory devices, e.g., DRAM, SRAM, EPROM, EEPROM, and flash memory devices. The storage device 230 may be any form of non-volatile memory, such as magnetic disk drives, e.g., internal hard disks or removable disks; magneto optical disk drives; and CD ROM and DVD-ROM disk drives. The processor 210 and the memory 220 can be supplemented by, or incorporated in, special purpose logic circuitry.

Figure 3:
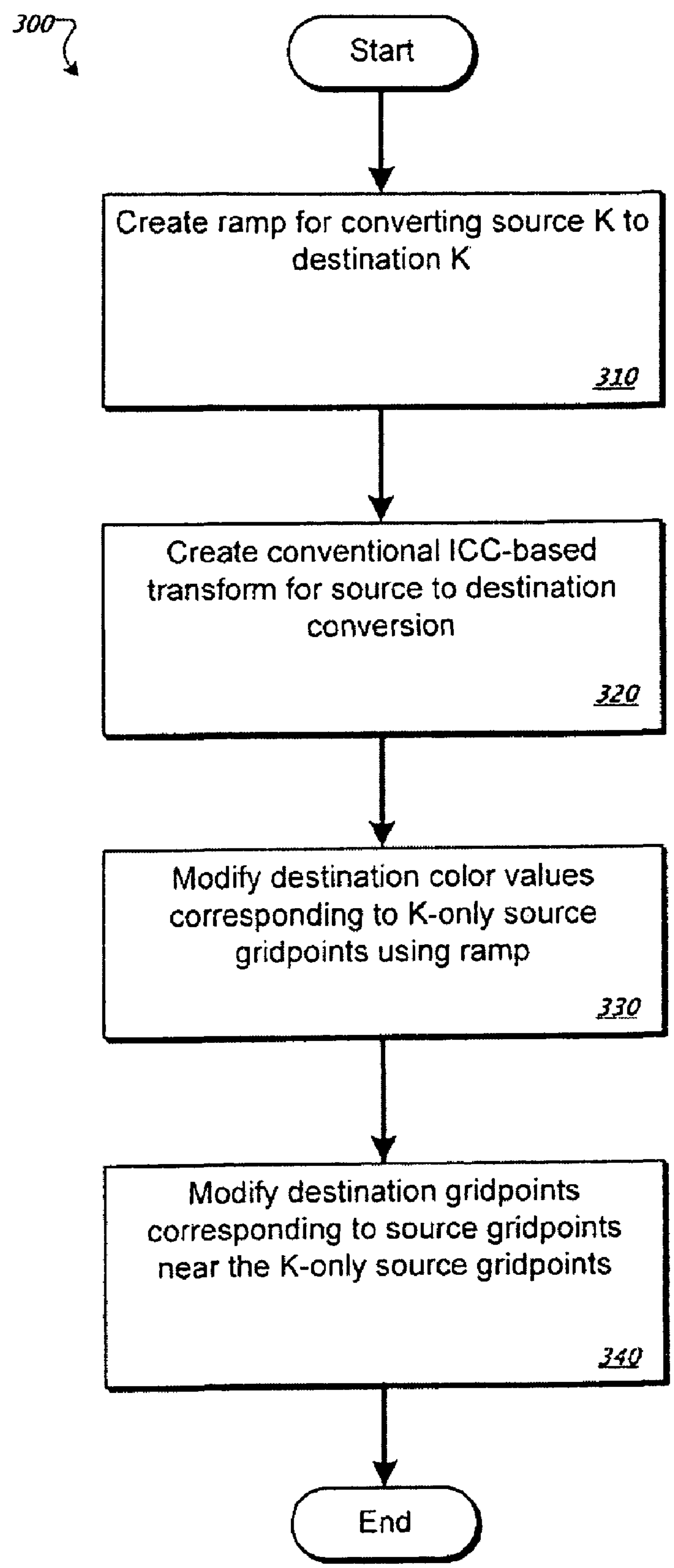
FIG. 3 is a flow chart illustrating a process for creating a LUT to transform color values from a source to a destination color space while preserving K-only values.

FIG. 3 is a flow chart illustrating a process 300 for creating a LUT to transform color values from a source to a destination color space while preserving K-only values. Generally, process 300 involves modifying a conventional LUT using a conversion ramp for pure gray colors and a smoothing function for near-gray colors. At 310, a ramp for converting a source K-component value to a destination K-component value is created. The ramp is created by combining a source ramp with an inverted destination ramp. The source ramp constructed using the source color profile to map source K-component values ranging from 0 to 100% intensity to corresponding device-independent luminance component values, such as Y in the CIE XYZ color space. The destination ramp is constructed using the destination color profile to map destination K-component values ranging from 0 to 100% intensity to corresponding device-independent luminance component values. The destination ramp is inverted and combined with the source ramp. The destination K-component values may be capped by a maximum K ink. The maximum K of the destination color space may be determined by converting the darkest possible color, such as CIE L*a*b* color value of (0,0,0), to the destination color space and using the resulting K as the maximum K ink.

At 320, a conventional LUT transform is created. The conventional LUT may be a four-dimensional LUT that maps a source CMYK color space to a destination CMYK color space. A conventional LUT may be constructed by transforming a regularly spaced grid of colors in the source color space to the destination color space using the color profiles of the source and destination color spaces. Each source color space grid point and its corresponding transform point in the destination color space may be stored in the LUT. A LUT may contain any number of grid points, for example a 16×16×16×16 LUT may be created.

At 330, the destination color values in the LUT that correspond to K-only source grid points are modified using the conversion ramp. The conversion ramp is applied to each K-only source grid-point to determine a corresponding K-only value in the destination color space. Each corresponding K-only value is used to modify the LUT by replacing the destination color component values that correspond to the K-only source grid point with zero values for the C, M, and Y components and the corresponding K-only value for the K component.

At 340, the destination color values in the LUT that correspond to source grid points that are near the K-only source grid points (near gray grid points) are modified. The modification of the near gray grid points involves using a smoothing function to reduce large changes in values between pure gray and near gray grid points. The largest change in color component values is between values corresponding to a pure gray source grid point and its bordering grid points. Instead of making a large change in component values over a single grid point, the large change may be gradually made over two or three near gray grid points using a smoothing function.

Figure 4:
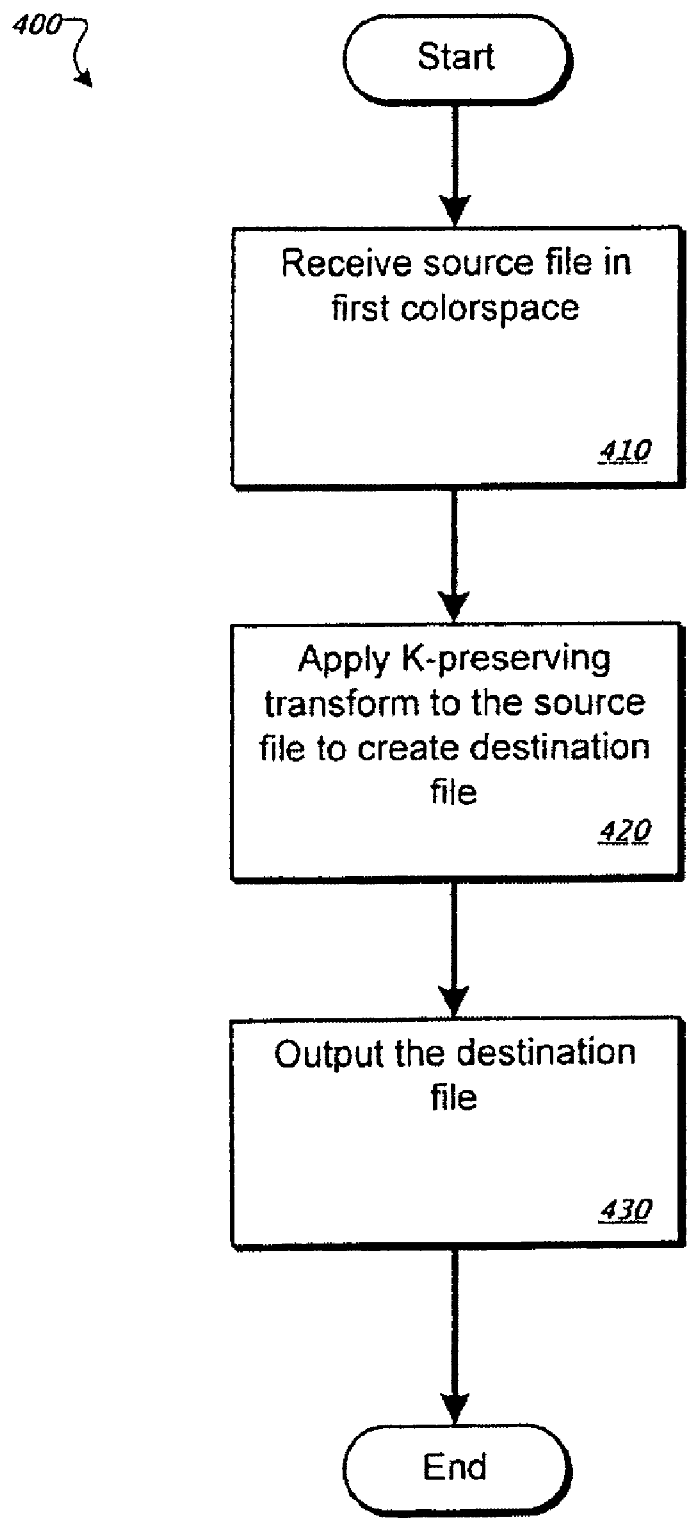
FIG. 4 is a flow chart illustrating a process for converting color data using a LUT to transform color values from a source to a destination color space while preserving K-only values.

FIG. 4 is a flow chart illustrating a process 400 for converting color data using a LUT to transform color values from a source to a destination color space while preserving K-only values. At 410, an input file containing color data in a source color space is received. The input file may conform to any of a variety of standards or formats. The color data is read from the input file. At 420, the color data is transformed to a destination color space. The modified LUT created in process 300 may be applied to perform the conversion. At 430, the converted data is placed in an output file. The output file may have the same format as the input file or it may be different. The input file may be modified to create the output file.

FIG. 5 is a code excerpt of example computer program implementing portions of the described subject matter. The excerpt is written using C/C++ syntax and is not exhaustive of any portion of the subject matter described herein nor is it representative of the only implementation of the subject matter. In FIG. 5, a 16×16×16×16 LUT is modified. It may be assumed that prior to executing the excerpt that the LUT is derived from conventional processing steps and contains a mapping from a first color space to a second color space. The kGridSize is 16, which represents the number of grid points for each color component in the LUT. This results in a kModifyRadius of 2, which is used to determine whether to apply the smoothing function to a near gray grid point. The excerpt loops through the entire input grid and executes one of three branches depending on the type of grid point upon which the excerpt is operating. The three types of grid points are the pure gray colors, the near gray colors, and the other (far) colors. For the pure gray input colors, the C, M, and Y values of the corresponding output color are set to zero and the K value is set to the ramp-converted K-value. For the near gray colors, i.e., those colors within the kModifyRadius, the following steps are performed: (1) compute the distance as the maximum of the C, M, and Y component; (2) modify the distance using the sigmoid function; (3) for each of the C, M, and Y component values, replace the original component value with the product of the modified distance and the original component value; and (4) for the K component value, replace the original K component value with the linear interpolation between the original K component value and the ramp-modified K component value. The far colors are not changed.

Figure 6:
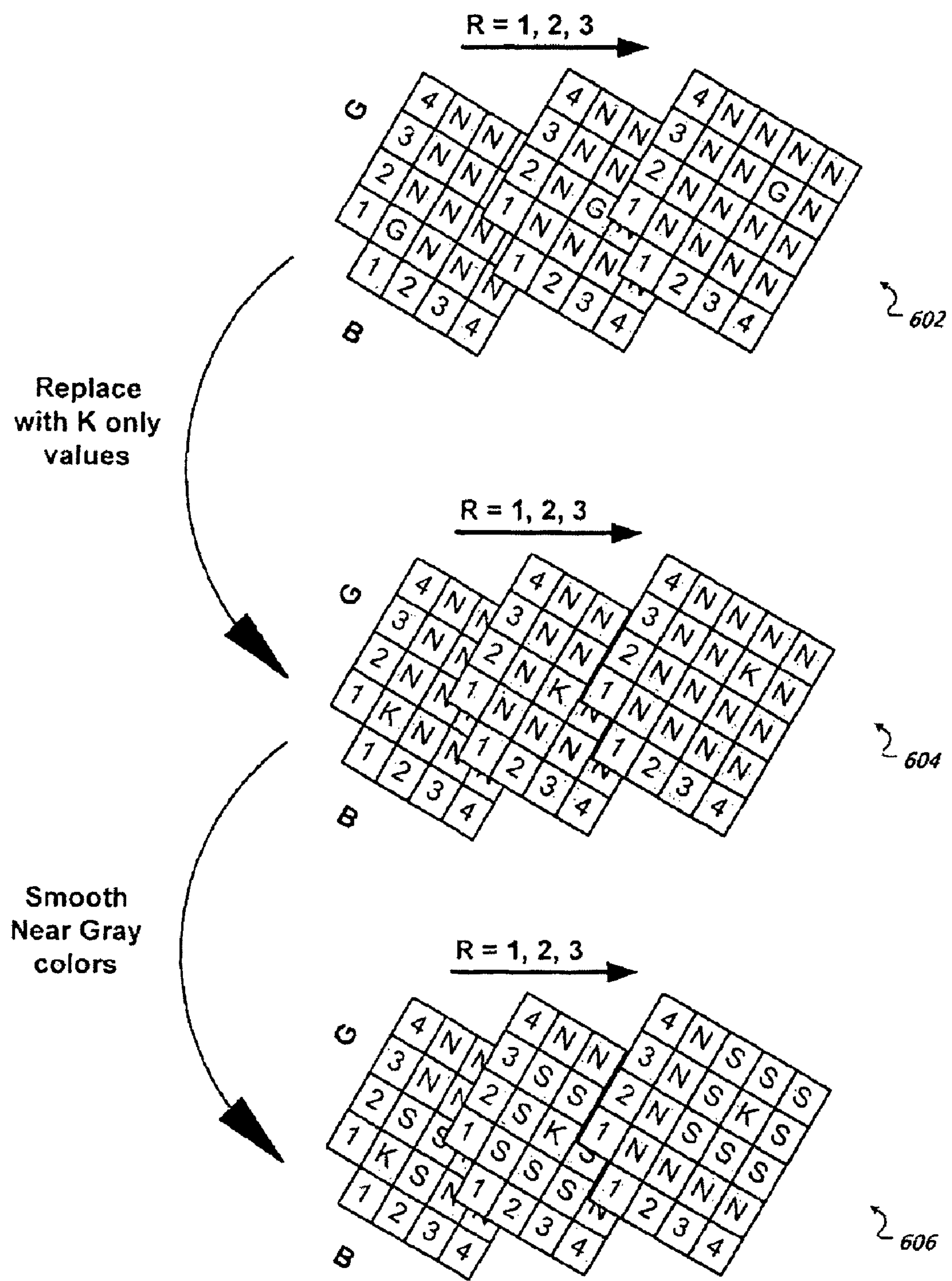
FIG. 6 is a graphical representation of the transformations made to a LUT.

FIG. 6 is a graphical representation of the transformations made to a LUT. Original LUT 602 depicts an example LUT that converts color values from an RGB color space to a CMYK color space. The original LUT 602 may be created using conventional methods. Each grid within the depicted LUTs represents a slice of the LUT at different R component values. The axes of each grid are the G and B component values. The values in each grid space represent a corresponding value in the destination CMYK color space. The actual destination values are not depicted, but each destination value's type is depicted. The types include the following: "N" represents non-gray color values present in the original LUT; "G" represents gray color values present in the original LUT that have at least one non-zero C, M, or Y component value; "K" represents gray values that have zero C, M, and Y component values; and "S" represents non-gray color values that have been smoothed. The G values in the original LUT 602 are replaced with K values in the second LUT 604. The K values are derived using a conversion ramp. In the third LUT 606, values near the K values have been smoothed using a smoothing function. As can be seen in LUT 606, those values separated by one grid point from the K values are smoothed. In other implementations, grid points separated by a larger predetermined distance may also be used. Some values in LUT 606 remain the same values that were in the original.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:

identifying a lookup table used to convert a color value comprising a plurality of color component values from a first color space to a second color space, the lookup table comprising a first plurality of color values associated with the first color space and a second plurality of color values associated with the second color space, each of the first plurality of color values having a corresponding color value in the second plurality of color values;

identifying a pure gray color value from the first plurality of color values, the pure gray color value having a corresponding non-pure gray color value in the second plurality of color values;

determining a corresponding pure gray color value in the second color space that is substantially equivalent to the pure gray color value from the first plurality of color values;

modifying the lookup table by replacing the corresponding non-pure gray color value in the second plurality of color values with the corresponding pure gray color value in the second color space;

identifying one or more near gray color values from the second plurality of color values, the one or more near gray color values being located in relatively close proximity in the lookup table to the corresponding pure gray color value in the second color space; and modifying the lookup table by replacing the one or more near gray color values using a smoothing function.

2. The method of claim 1, wherein the one or more near gray color values are identified as being located in relatively close proximity in the lookup table to the corresponding pure gray color value in the second color space based on the one or more near gray color values having color component values that are close in value to the corresponding non-pure gray color value in the second plurality of color values.

3. The method of claim 1, wherein the smoothing function comprises a function having at least two extremes, the at least two extremes each having a slope that approaches zero.

4. The method of claim 1, wherein modifying the lookup table by replacing the one or more near gray color values using a smoothing function comprises, for each of the one or more near gray color values:

calculating a first distance based on the proximity in the lookup table of the near gray color value to the corresponding pure gray color value in the second color space, the near gray color value comprising a non-gray component value and a gray component value;

determining a second distance by applying a sigmoid function to the first distance;

determining a new non-gray component value for the near gray color value by multiplying the non-gray component value of the near gray color value by the second distance; and determining a new gray component value by interpolating between a gray component of the corresponding pure gray color value and the gray component of the near gray color value.

5. The method of claim 1, wherein determining a corresponding pure gray color value in the second color space that is substantially equivalent to the pure gray color value from the first plurality of color values is based on a perceptual relationship between a rendering of the corresponding pure gray color value in the second color space and a rendering of the pure gray color value from the first plurality of color values.

6. The method of claim 1, wherein the first color space comprises a Red, Green, Blue (RGB) color space; the pure gray color value comprises Red, Green, and Blue component values that are equal to one another; and the corresponding non-pure gray color value comprises Red, Green, and Blue component values that are not equal to one another.

7. The method of claim 1, wherein the first color space comprises a Cyan, Magenta, Yellow, Key (CMYK) color space; the pure gray color values comprises Cyan, Magenta, and Yellow component values that are equal to zero; and the corresponding non-pure gray color value comprises at least one of a Cyan, Magenta, or Yellow component value that is not equal to zero.

8. The method of claim 7, wherein the plurality of color values from the first color space comprises at least 16 component values for each of the CMYK color components.

9. The method of claim 1, wherein the lookup table is initially populated using a first color profile associated with the first color space and a second color profile associated with the second color space.

10. The method of claim 1, wherein the first plurality of color values associated with the first color space comprises equally spaced grid points whose values range from a lowest intensity to a highest intensity for each component in the first color space.

11. The method of claim 10, wherein each of the one or more near gray color values comprise grid points that are within three grid points of the corresponding pure gray color value in the second color space.

12. The method of claim 1, wherein determining a corresponding pure gray color value in the second color space comprises:

determining a maximum pure gray color value in the second color space by converting the darkest color of an independent color space to the second color space using a color profile associated with the second color space;

mapping each of a plurality of pure gray color values from the first color space to a first corresponding luminance value in the independent color space using a color profile of the first color space;

mapping each of a plurality of pure gray color values from the second color space to a second corresponding luminance value in the independent color space using a color profile of the second color space; and for each of the plurality of pure gray color values from the first color space, determining a corresponding pure gray color value from the second color space, using the maximum pure gray color value in the second color space and the first and the second corresponding luminance values in the independent color space.

13. The method of claim 1, further comprising:

receiving a file comprising input color data in the first color space;

converting the input color data to the second color space using the modified lookup table; and storing the converted input data.

14. A computer program product, encoded on a computer-readable medium, operable to cause a data processing apparatus to perform operations comprising:

identifying a lookup table used to convert a color value comprising a plurality of color component values from a first color space to a second color space, the lookup table comprising a first plurality of color values associated with the first color space and a second plurality of color values associated with the second color space, each of the first plurality of color values having a corresponding color value in the second plurality of color values;

identifying a pure gray color value from the first plurality of color values, the pure gray color value having a corresponding non-pure gray color value in the second plurality of color values;

determining a corresponding pure gray color value in the second color space using the pure gray color value from the first plurality of color values;

modifying the lookup table by replacing the corresponding non-pure gray color value in the second plurality of color values with the corresponding pure gray color value in the second color space;

identifying one or more near gray color values from the second plurality of color values, the one or more near gray color values corresponding to color values in the first plurality of color values that are proximate to the pure gray color value from the first plurality of color values; and modifying the lookup table by replacing the one or more near gray color values using a smoothing function.

15. The product of claim 14, wherein the first color space comprises a Cyan, Magenta, Yellow, Key (CMYK) color space; the pure gray color values comprises Cyan, Magenta, and Yellow component values that are equal to zero; and the corresponding non-pure gray color value comprises at least one of a Cyan, Magenta, or Yellow component value that is not equal to zero.

16. The product of claim 14, wherein the lookup table is initially populated using a first color profile associated with the first color space and a second color profile associated with the second color space.

17. The product of claim 14, wherein the lookup table comprises equally spaced grid points whose values range from the lowest intensity to the highest intensity for each component in the first color space.

18. The product of claim 17, wherein identifying one or more near gray color values in the second plurality of color values, comprises:

identifying one or more color values in the first plurality of color values associated with grid points that are within a maximum number of grid points from a grid point associated with a pure gray color value from the first plurality of color values; and identifying one or more near gray color values in the second plurality of color values that correspond to the identified one or more color values in the first plurality of color values.

19. The product of claim 14, further operable to cause a data processing apparatus to perform operations further comprising:

receiving a file comprising input color data in the first color space;

converting the input color data to the second color space using the modified lookup table; and storing the converted input data.

20. The product of claim 14, wherein modifying the lookup table by replacing the one or more near gray color values using a smoothing function comprises, for each of the one or more near gray color values:

calculating a distance between the near gray color value and the corresponding pure gray color value in the second color space, the near gray color value comprising a non-gray component value and a gray component value;

determining a modified distance by applying a sigmoid function to the calculated distance;

determining a new value for the non-gray component value of the near gray color value by multiplying the non-gray component value of the corresponding near gray color value by the modified distance; and determining a new value for the gray component value of the near gray color value by interpolating between a gray component of the corresponding pure gray color value and a gray component of the near gray color value.

21. A system comprising:

memory configured to store a lookup table and a first color profile corresponding to a first CMYK color space and a second color profile corresponding to a second CMYK color space, wherein the lookup table comprises a first plurality of color values associated with the first CMYK color space and a second corresponding plurality of color values associated with the second CMYK color space, wherein the color values in the second plurality are determined based on the first and second color profiles, and wherein each of the color values comprises a C, M, Y, and K component value; and a processor communicatively coupled to the memory, the processor configured to:

to determine a conversion function for converting K component values in the first CMYK color space to K component values in the second CMYK color space;

identify a first color value entry in the first plurality of color value entries having C, M, and Y component values equal to zero;

identify a first corresponding color value entry in the second plurality of color value entries that corresponds to the first color value entry;

replace the C, M, and Y component values of the first corresponding color value entry with zero;

replace the K component value of the first corresponding color value entry with a K component value determined using the conversion function to convert the K component value of the first color value entry to a K component value in the second CMYK color space;

identify a second color value entry in the first plurality of color value entries within a predetermined distance from the first color value entry;

identify a second corresponding color value entry in the second plurality of color value entries that corresponds to the second color value entry; and apply a smoothing function to the second corresponding color value entry, wherein the smoothing function is based on a distance between one of the first color value entry and the second color value entry or the first corresponding color value entry and the second corresponding color value entry.

22. The system of claim 21, where the processor is further configured to:

receive a file having input color data in the first color space;

convert the input color data to the second color space using the lookup table; and storing the converted input data.

* * * * *